UNITED STATES PATENT OFFICE.

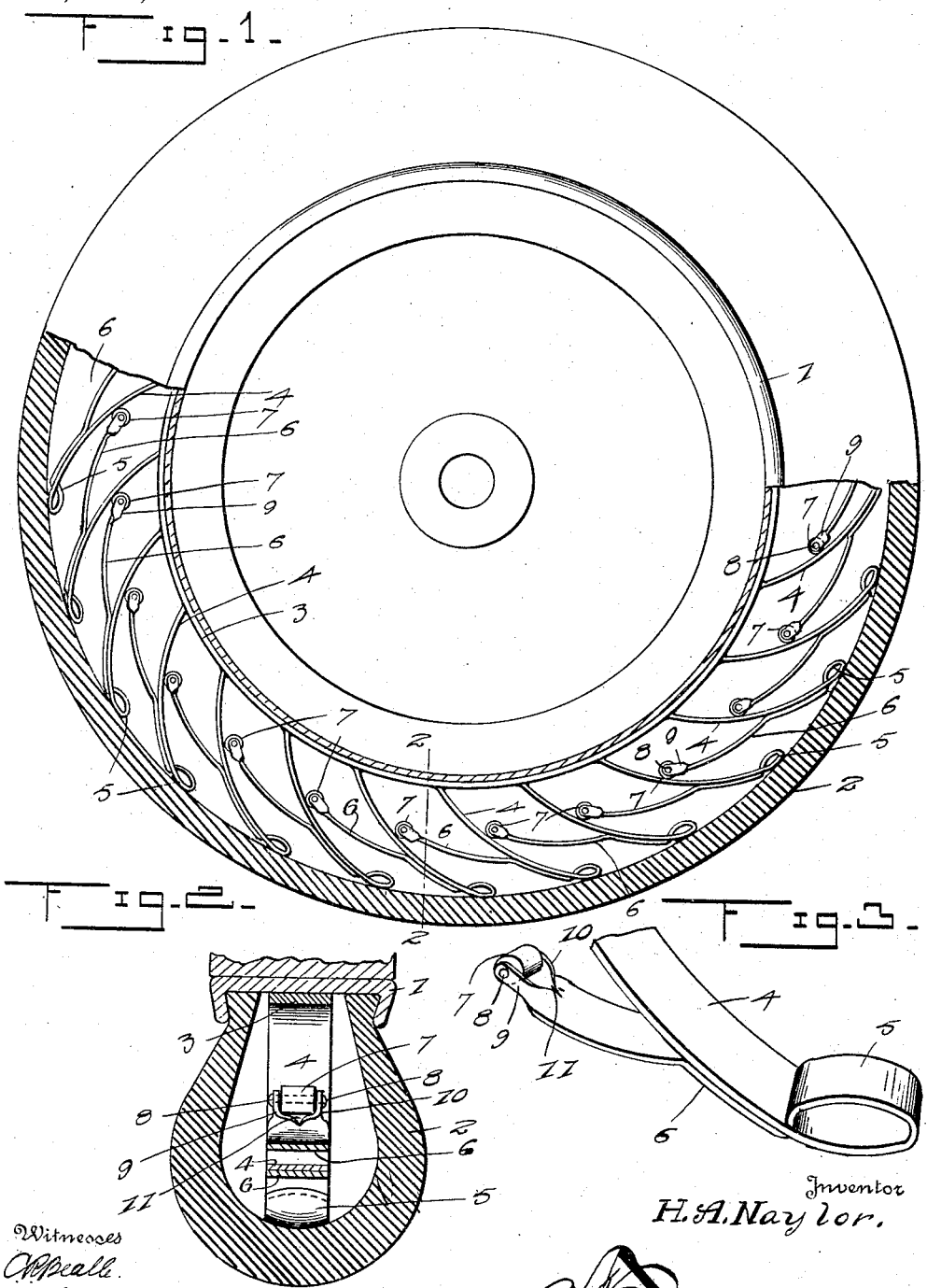

HENRY A. NAYLOR, OF VALPARAISO, CHILE.

RESILIENT TIRE.

1,211,869.  Specification of Letters Patent.  Patented Jan. 9, 1917.

Application filed June 22, 1916. Serial No. 105,187.

*To all whom it may concern:*

Be it known that I, HENRY A. NAYLOR, a subject of the King of Great Britain, residing at Valparaiso, Chile, South America, have invented certain new and useful Improvements in Resilient Tires; and I do hereby declare the following to be a full, clear, and exact description of the invention, such as will enable others skilled in the art to which it appertains to make and use the same.

This invention relates to resilient or spring tires for use upon motor vehicles, and the primary object of the invention is to provide a resilient or spring tire structure which may be used upon motor vehicle wheels in lieu of the ordinary type of pneumatic tires, for eliminating the inconveniences contingent with the puncturing or rupturing of the tire and it includes specifically a shoe of ordinary construction in which is mounted a resilient ring having a plurality of outwardly extending arcuate arms, the outer ends of which are rolled and engage the inner surface of the tread portion of the tire shoe, in slidable engagement; and also bracing arms which are connected to the outwardly extending resilient arms and have rollers or analogous anti-friction structures carried by their outer ends for engagement with the resilient outwardly extending arms rearwardly of the resilient arms to which the braces are attached.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a side elevation of the improved resilient tire showing parts thereof in section. Fig. 2 is a cross section on the line 2—2 of Fig. 1, and Fig. 3 is a fragmentary perspective view of one of the radiating resilient arm structures.

Referring more particularly to the drawing, 1 designates the rim of an ordinary motor vehicle wheel which rim has a tire shoe 2 attached thereto in any suitable or ordinary manner. Positioned internally of the shoe and extending circumferentially about the rim 1 of the motor vehicle wheel is a band 3 which is constructed of any suitable type of resilient metal. The band 3 has a plurality of arms 4 formed thereon or connected thereto. The arms 4 are constructed of suitable resilient metal and they have their outer ends rolled as shown at 5 for providing a rounded surface for engagement with the inner surface of the tread portion of the tire shoe 2. The rolled ends 5 of the resilient arms 4 may be round, oval shape or any desired shape so as to provide the proper surface for engagement with the inner surface of the tread portion of the tire shoe so as to render friction between the engaging parts of the tire shoe and the arms practically *nil*. Bracing arms 6 are attached to or formed upon the resilient arms 4 and they extend rearwardly from the rear surfaces of the resilient arms and have anti-friction rollers 7 rotatably carried by their outer ends which engage the forward or concave surfaces of the arm 4 as clearly shown in Fig. 1 of the drawing. The braces 6 act to brace the movement or action of the spring or resilient arms 4 and the provision of the rollers 7 eliminates friction between the ends of the braces and the concave surfaces of the resilient arms.

The rollers 7 are rotatably supported by pins 8 which pins are in turn carried by arms 9 and 10 formed upon the ends of the braces 6. The arms 9 and 10 are formed by splitting the ends of the braces 6 as shown at 11, and bending the split portions at right angles to the main body portion of the braces thereby increasing the rigidity of the outer ends of the bracing arms and consequently increasing their bracing action. If it is so desired, the ends of the braces 6 may be rolled for providing curved surfaces for engagement with the concaved surfaces of the arms 4 without departing from the spirit of this invention.

Upon disfiguration of the tire shoe 2, caused by its engagement with rocks or rough places in the road over which it is traveling, the shock occasioned by rough places will be partially absorbed by the resilient arms 4 which will move inwardly toward the inner band or ring 3 and immediately spring outward after the pressure is removed from the tire 2, thereby providing a resilient or spring tire.

In reducing the invention to practice, certain minor features of construction, combination and arrangement of parts may necessitate alterations to which the patentee is entitled provided such alterations are comprehended within the scope of what is claimed.

What is claimed is:—

In a resilient tire structure, the combination with a wheel rim and a tire shoe mounted upon said rim, of a band extending circumferentially about said rim, a plurality of resilient arcuate arms connected to said band and extending outwardly therefrom, the outer ends of said arms being rolled for presenting curved surfaces to the inner surface of the tire shoe, bracing arms secured to said arcuate arms a short distance inwardly from their rolled ends, said bracing arms abutting the rear surface of said arcuate arms for substantially one-third of the length of the arcuate arms and extending tangentially therefrom toward the arcuate arms next to the ones to which they are connected, and rollers carried by the free ends of said bracing arms and engaging the concaved surfaces of the arcuate arms.

In testimony whereof I affix my signature in presence of two witnesses.

HENRY A. NAYLOR.

Witnesses:
M. I. LEWIS,
BENNETT S. JONES.

Copies of this patent may be obtained for five cents each, by addressing the "Commissioner of Patents, Washington, D. C."